June 15, 1948.  W. E. MACK  2,443,319
TRACTION DEVICE
Filed March 2, 1946  2 Sheets-Sheet 1
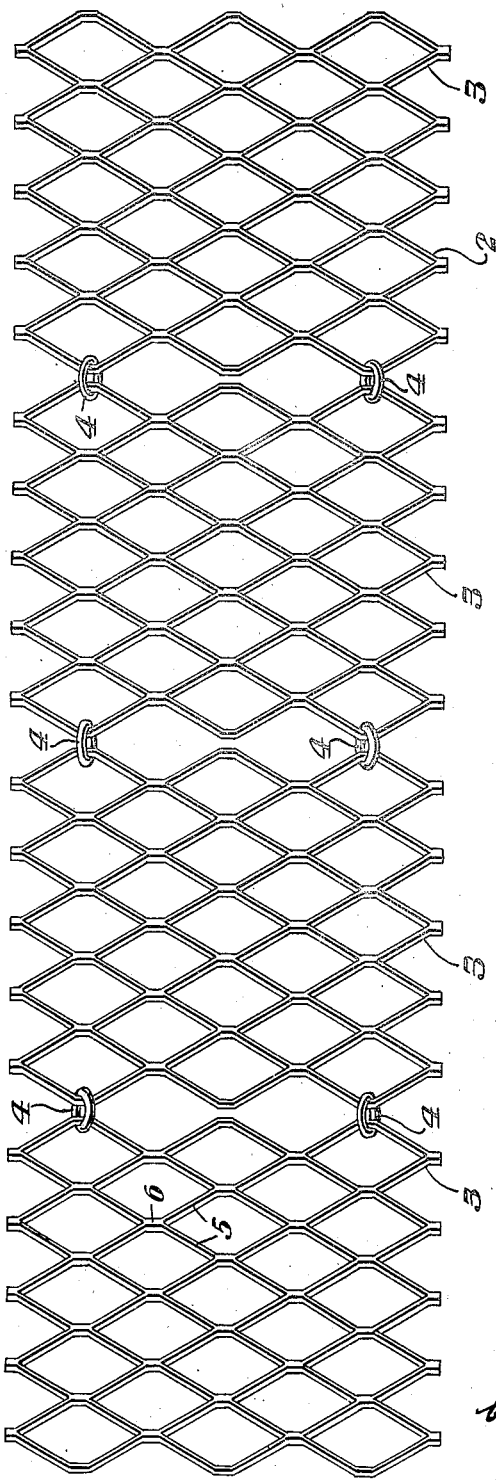
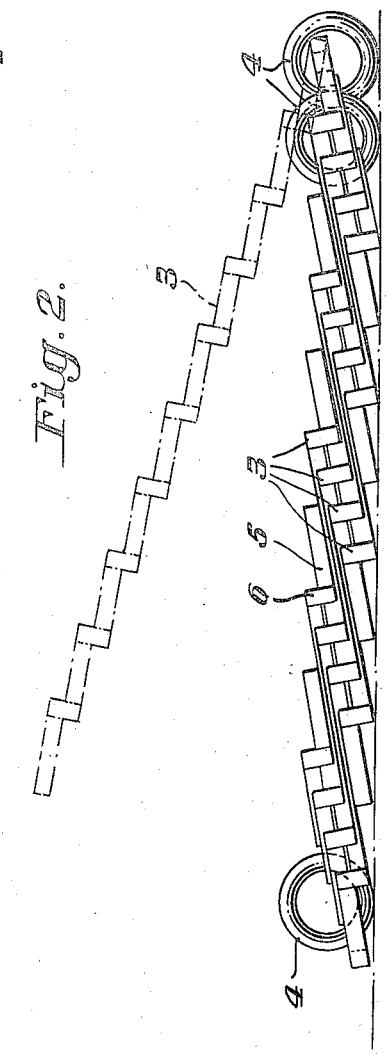
INVENTOR
Wayne E. Mack

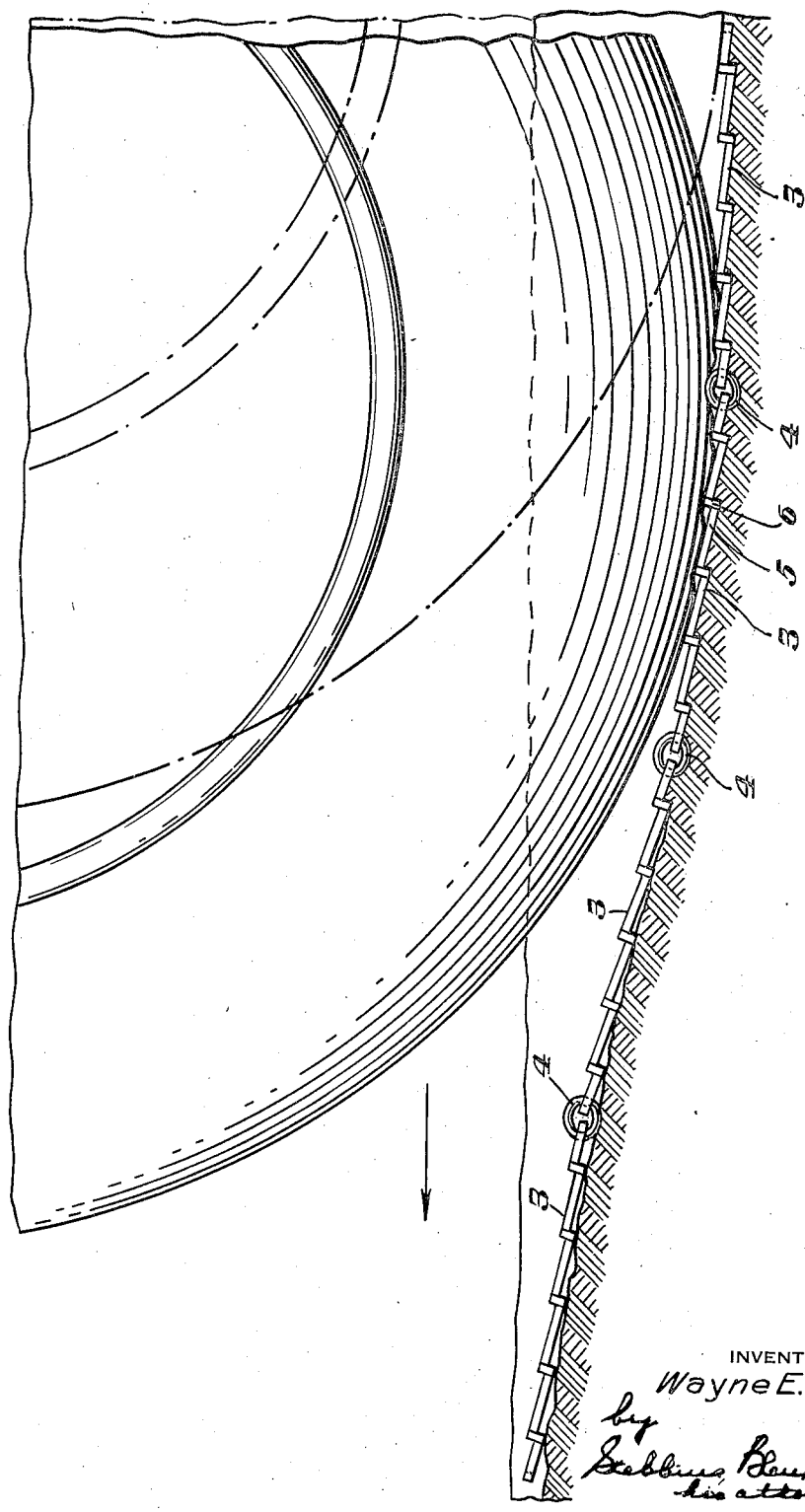

Patented June 15, 1948

2,443,319

UNITED STATES PATENT OFFICE 2,443,319

TRACTION DEVICE

Wayne E. Mack, Martins Ferry, Ohio, assignor to Wheeling Steel Corporation, Wheeling, W. Va., a corporation of Delaware Application March 2, 1946, Serial No. 651,487

4 Claims. (Cl. 238—14)

This invention relates to traction devices, particularly devices for use in extricating automobiles and other vehicles which have become bogged down in mud or which are stuck in snow or ice so that the traction afforded by normal operation of the vehicle is insufficient to move it.

Many traction devices for the purpose above mentioned have heretofore been proposed, but none of them, so far as I am aware, has proved entirely satisfactory. One such device consists of permanently curved stiff metal plates connected together by linkage, the plates having transversely extending ribs forming anti-skid surfaces. Such devices are not fully satisfactory because the stiff, imperforate plates do not properly adapt themselves to all conditions encountered in use; moreover, the plates which are purposely made stiff so as to be inflexible are of necessity heavy, cumbersome, and difficult to handle. Other devices such as chains, portable fabric tracks, linked metal plates having pyramidal projections, wire mesh, etc., have been proposed but none of them has satisfactorily solved the problem.

I have found that in order to satisfactorily enable extrication of an automobile bogged down in mud or stuck in snow or ice under various conditions which may be encountered, a traction device should comprise a plurality of articulated members, each member being of generally sheet form, being foraminous and having at both principal faces projections forming anti-skid surfaces. Each member should be of such strength as to be flexible when laid on a non-planar surface and subjected to the load transmitted through a wheel of an automobile disposed thereon. I find that light or medium gauge expanded metal is ideally suited to use as a traction device for automobiles. Both principal faces of the expanded metal sheets have projections which form anti-skid surfaces, the sheets are foraminous permitting mud, earth, snow, etc., to penetrate them, and devices made of articulated sheets of expanded metal are easy to manipulate, consume little space, and are light in weight and inexpensive.

Other details, objects and advantages of the invention will become apparent as the following description of a present preferred embodiment thereof proceeds.

In the accompanying drawings I have shown a present preferred embodiment of the invention and have illustrated the use thereof, in which Figure 1 is a plan view of a traction device consisting of four articulated sheets of expanded metal;

Figure 2 is an edge view of the device shown in Figure 1 but to enlarged scale, the device being shown collapsed; and Figure 3 is a diagrammatic view illustrating use of the traction device.

Referring now more particularly to the drawings, there is shown a traction device designated generally by reference numeral 2 and which comprises sheets 3 of expanded metal articulated by metal rings 4. The expanded metal is preferably of the guillotine type consisting of strands 5 connected by bonds 6. The expanded metal is of light or medium gauge and is of such strength as to be flexible when laid on a non-planar surface and subjected to the load transmitted through a wheel of an automobile disposed thereon as shown in Figure 3.

The sheets of expanded metal may be of any desired size and shape. I find it convenient to employ sheets 6" or 8" long and of somewhat similar width. Any number of such sheets may be articulated together to form a traction device of desired length. Each individual sheet should be short enough lengthwise of the device to enable the device to readily conform itself to irregularities in the surface to which it is applied and also each sheet should be flexible as above stated, whereby much better traction is afforded than when a rigid device is used. The strands and bonds of the expanded metal form ideal anti-skid projections. As shown in Figure 3, when the device is laid down and employed to extricate an automobile from mud or the like, the projections at one face of the expanded metal dig into the base upon which the device is laid, and the projections at the other face are in anti-skid relation to the automobile tire. The generally diamond-shaped openings in the expanded metal allow earth or the like to pass therethrough when the device is laid down, thus facilitating proper positioning of the device and also increasing its efficiency, as such a device would under all except the most unusual conditions maintain its position and not slide out from under an automobile wheel when the wheel is rotated. While the device may be positioned either side up and with either end in the direction in which the vehicle is to be moved, the best efficiency is obtained by positioning it as shown in Figure 3 in which the vehicle is being moved toward the left. The bonds or bridges of the expanded metal at the lower face thereof extend into the earth, and those at the upper face indent the pneumatic tire, bringing about maximum efficiency of the device.

When not in use the device may be collapsed as shown in Figure 2, and when so collapsed it occupies very little space. Figure 2 shows in approximately full-scale a satisfactory device which I have employed. One or two of the devices may conveniently be kept in an automobile for use when required.

With reference to Figure 3, it will be noted that the characteristics of the expanded metal of which the sheets are made are such that the best gripping effect on one side is in the opposite direction to the best gripping effect on the opposite side. This makes for maximum efficiency when the device is used as shown in Figure 3 since, viewing that figure, the thrust on the device from the wheel is from left to right, and the thrust on the device from the ground is from right to left.

While I have shown and described a present preferred embodiment of the invention, it is to be distinctly understood that the invention is not limited thereto but may be otherwise variously embodied within the scope of the following claims.

I claim:

1. A portable traction device adapted to be applied beneath the wheels of vehicles comprising a plurality of articulated members, each member being of generally sheet form, being foraminous and having at both principal faces projections forming anti-skid surfaces.

2. A portable traction device adapted to be applied beneath the wheels of vehicles comprising a plurality of articulated sheets of expanded metal of such strength as to be flexible when laid on a non-planar surface and subjected to the load transmitted through a wheel of an automobile disposed thereon.

3. A traction device comprising a plurality of articulated members, each member being of generally sheet form, being foraminous and having at both principal faces projections forming anti-skid surfaces, the projections at each face of a member extending generally at an acute angle to the general plane of the member, the projections at the respective faces extending generally in opposite directions so that when the device is laid on the ground with a vehicle wheel bearing on the upper surface of said member and with the member arranged with the projections extending generally parallel to the plane of the wheel the generally upwardly extending projections most effectively oppose slippage of the wheel relatively to the member when the wheel is turned in one direction and the generally downwardly extending projections most effectively oppose movement of the member along the ground in the direction in which the force exerted by the wheel tends to move it when the wheel is turned in said direction.

4. A traction device comprising a plurality of articulated sheets of expanded metal which can be folded into compact form when not in use, the projecting portions of the expanded metal at each face of a sheet extending generally at an acute angle to the general plane of the sheet, the projections at the respective faces extending generally in opposite directions so that when the device is laid on the ground with a vehicle wheel bearing on the upper surface of said sheet and with the sheet arranged with the projections extending generally parallel to the plane of the wheel the generally upwardly extending projections most effectively oppose slippage of the wheel relatively to the sheet when the wheel is turned in one direction and the generally downwardly extending projections most effectively oppose movement of the sheet along the ground in the direction in which the force exerted by the wheel tends to move it when the wheel is turned in said direction, the device therefore requiring no anchorage other than that provided by said projections when the device is in use.

WAYNE E. MACK.

REFERENCES CITED

The following references are of record in the file of this patent:

UNITED STATES PATENTS

| Number | Name | Date |
|---|---|---|
| 1,324,291 | Austen | Dec. 9, 1919 |
| 2,243,723 | Tench | May 27, 1941 |
| 2,346,477 | Ederer | Apr. 11, 1944 |
| 2,406,557 | Nagin | Aug. 27, 1946 |